Patented Apr. 25, 1939

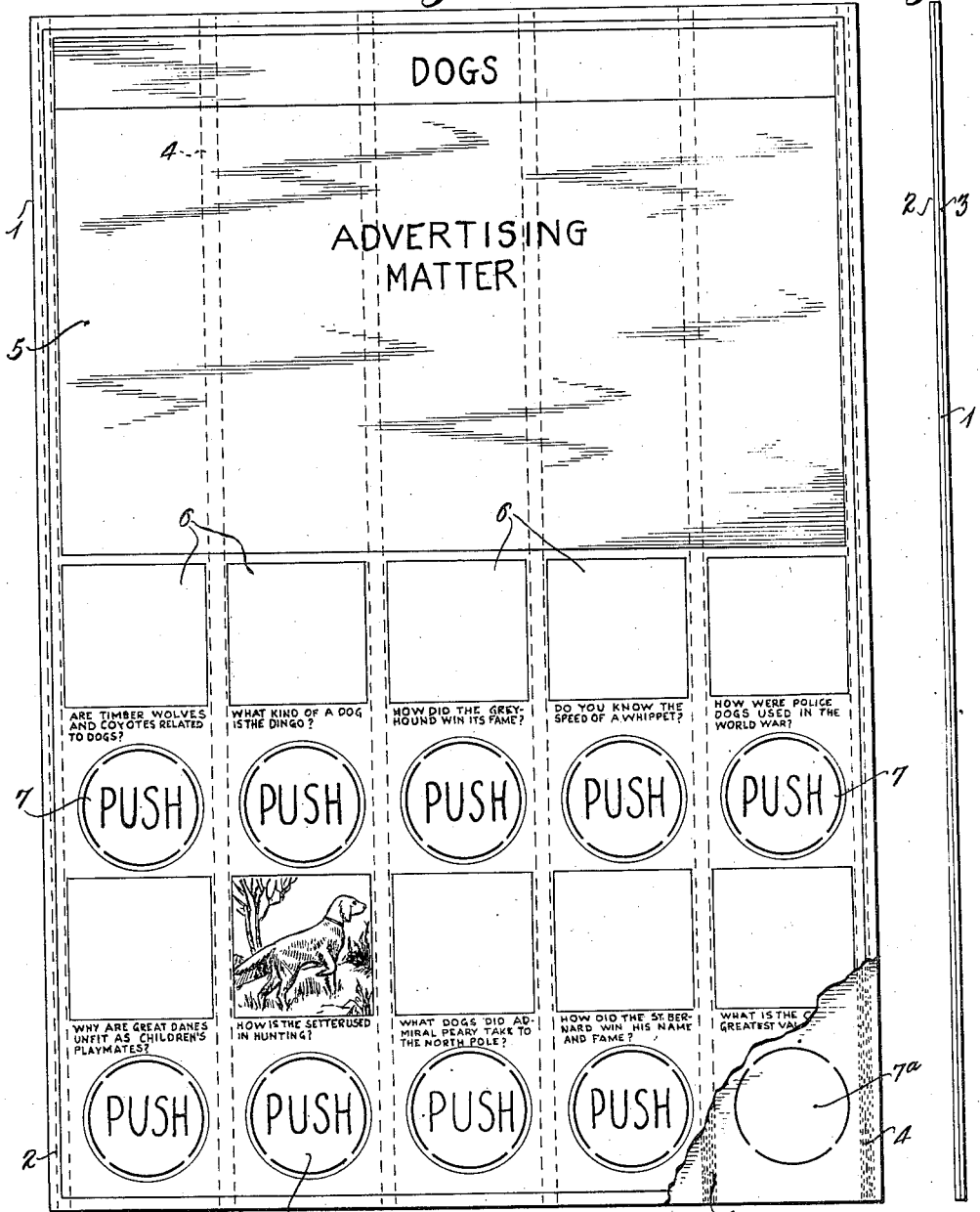

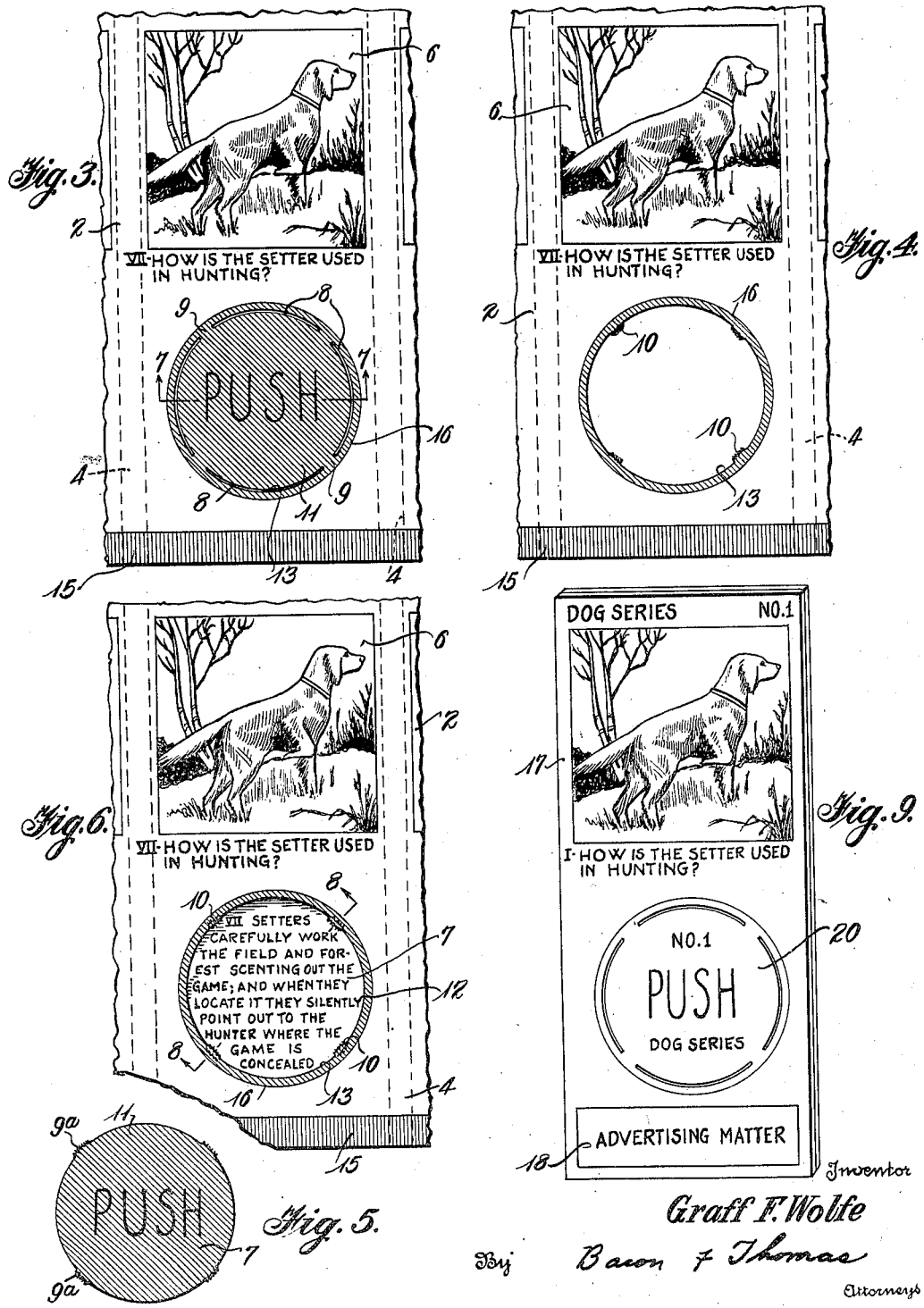

2,155,814

UNITED STATES PATENT OFFICE 2,155,814

GAME

Graff F. Wolfe, Minneapolis, Minn.

Application July 8, 1937, Serial No. 152,623

8 Claims. (Cl. 35—9)

This invention relates to an article in the form of a game which is made primarily to be given away for advertising purposes. More specifically, the invention relates to a game in the nature of questions and answers, the answers being concealed from view so that a player can gain no intimation thereof prior to giving his answer orally. Thereafter, the correct answer may be revealed in the presence of the remaining players to verify or disprove the answer given by said player.

The principal object of the invention is to provide an article of the class described which can be manufactured cheaply enough to be given away free, and yet which is of such a novel, attractive, and curiosity-arousing nature as to induce the recipient thereof to keep the same for use as an educational and entertainment device; instead of discarding the same after a glance, as is usually done with the general run of advertising matter.

Another important object of the invention is to provide a game or advertising device of the above character which is of such a nature as to inherently appeal to children and adults alike.

Another object of the invention is to provide a game in which a considerable number of players may participate, and which game has advertising matter arranged thereon so that it inevitably, yet inoffensively comes to the notice of the several players.

A more specific object of the invention is to provide a game of the question-and-concealed-answer type in which the questions relate to a selected interesting subject; the answers to said questions being normally concealed from view. It will be obvious that the questions and answers may relate to any subject of general or special interest, or to the ingredients, uses, manufacture, etc., of certain products such as: a beverage, food product, lubricant, soap, etc. It is also contemplated that, as a further attraction and feature of the device, suitable pictorial illustrations related to the subject-matter of the questions be disposed in appropriate relation to said questions.

A further object of the invention is to provide a game of the class described in the form of a card having questions printed or otherwise applied thereon, and preferably embodying push-out sections containing concealed answers to said questions, and which card is so constructed that said sections may be ejected and subsequently replaced and retained in their respective openings with said answers revealed.

A still further object of the invention is to provide a card having push-out sections, and which card may be employed for any suitable purpose, the card having means which permits reinsertion or reassembly and retention of the push-out sections, preferably in their original apertures.

The above objects are achieved through the provision of a device of the push-card type which may have a number of different pictures thereon, preferably although not necessarily, all relating to a common subject or product. For the purpose of illustration, a card is disclosed herein which may contain a series of pictures, questions, and answers generally relating to dogs.

Referring to the particular subject chosen for illustrative purposes, it is apparent that the series of pictures or illustrations may depict such dogs as, the greyhound, the whippet, the police dog, the setter, etc. A question designed to bring out an interesting fact concerning the particular dog may be arranged below each illustration. An answer to each of said questions is preferably arranged below said questions upon the reverse or concealed side of a push-disk, said answers being readily ascertainable by pushing said disks through the card, and then reversing the same to reveal the answer. One of the main features of the invention is that the card is provided with novel means which enables the push-disks to be reinserted and retained in their respective openings to facilitate reading of said answers and to prevent loss of said disks.

In the preferred form of the invention, advertising matter is arranged upon a card, together with a number of pictures, questions, and answers so as to concentrate the attention of several persons to a single piece of advertising material. It will be understood, however, that the pictures may be omitted if desired. It will also be obvious that individual cards containing appropriate advertising matter and having but a single question and answer, or a single picture, question, and answer, may be made within the spirit of the invention.

Various objects and features of the invention, in addition to those specifically enumerated above, will be apparent from the following description taken in conjunction with the accompanying drawings, in which:

Figure 1 is a front view of a game or push-card embodying the present invention illustrating a novel manner in which advertising matter, a plurality of pictures, questions, and push-disks containing answers to said questions, may be associated in a single card;

Figure 2 is an end view of the card shown in Figure 1;

Figure 3 is an enlarged view of a fragment of the card shown in Figure 1 and illustrating one species of dog, to wit, a setter, with an appropriate question relative to said dog arranged below said illustration, and a push-disk containing a concealed answer to said question arranged below said question;

Figure 4 is a view similar to Figure 3 but showing the fragment of the card as it appears after the push-disk has been ejected;

Figure 5 is a view of an ejected push-disk;

Figure 6 is a view similar to Figure 3 but showing the push-disk reversed and reassembled in the push-hole opening so that the answer which it bears is revealed;

Figure 7 is a sectional view taken on the line 7—7 of Figure 3;

Figure 8 is a sectional view taken on the line 8—8 of Figure 6; and

Figure 9 is a modification of the invention showing a relatively small card embodying space for advertising matter, and a single picture, question and concealed answer.

Referring now more particularly to Figures 1 and 2 of the drawings, the game or push-card is generally indicated by the reference numeral 1 and consists of two layers of fairly stiff cardboard; a top or front layer 2, and a bottom or back layer 3. The layers 2 and 3 are preferably secured together by narrow bands of any suitable adhesive 4 in a manner more fully disclosed and described in copending application, Serial No. 152,624, filed July 8, 1937.

The front layer 2 has the title or the name of the subject to which the particular game is devoted printed upon the upper face thereof near its upper edge. In the present illustration, the title or subject is indicated as "Dogs". Below said title is an ample space 5 upon which may be inscribed appropriate advertising matter in the form of one or more illustrations, or slogans, or suitable descriptive matter.

Below the space 5 is a plurality of rows of spaces 6, each of which, preferably although not necessarily, contains an illustration of a different kind of dog. By way of example, one of the spaces 6 may illustrate a greyhound, another a whippet, another a police dog, still another a setter, etc. Various dogs, however, have not been illustrated in Figure 1 because it is believed that the invention can be readily understood without detailed illustration of such dogs, and further, in view of the fact that one specie of dog is shown in Figure 3 and fully described hereinafter as a specific illustration of the invention.

A question is printed below each of said spaces 6 and relates to the specie of dog illustrated in the space immediately above the same. Said questions are framed in such terms as to bring out an especially interesting use, fact, characteristic, etc., concerning the particular dog illustrated. Figure 1 embodies a number of illustrative questions falling within the above.

As a specific example, Figure 3, which is an enlarged view of a fragment of the card of Figure 1, shows one of the spaces 6 containing a picture of a setter in a position that it may assume while on the hunt. An appropriate question relating to setters appears below the illustration in the form of: "How is the setter used in hunting?" An answer to the above question, and to the respective questions indicated by Figure 1, is to be found upon a push-section or push-disk 7, one of which is located below each of said questions. Said push-disks may be formed in the card 1 by any suitable cutting or punching tool (not shown). As illustrated in greatly exaggerated form in Figure 7, the tool is adapted to cut completely through the cardboard sections 2 and 3 to form very narrow slits 8. The slits 8 are relatively arranged with respect to each other so as to form segments peripherally outlining the disk 7 in the top cardboard section 2 and a similar and subjacent disk 7ª in the bottom cardboard section 3. It will be understood, however, that the push sections 7 and 7ª need not be circular but may be oval-shaped or of any other desirable configuration.

The adjacent ends of the slits 8 are separated by uncut portions 9 which are adapted to be broken when the disks 7 and 7ª are ejected or pushed out of their respective cardboard sections. These uncut portions are preferably of substantial width, and while four such uncut portions have been shown in Figure 3, it will be understood that any suitable number may be used and that the proportions thereof and number may be varied according to the diameter of the disks.

As a result of the ejection of the push-sections 7 and 7ª, the uncut portions 9 are broken and form ears 10 which have more or less jagged edges and project slightly inwardly from the lines or slits 8 initially defining the periphery of said push-sections. When the layers 2 and 3 of the card 1 are formed from cardboard made of relatively long fibers, the ears 10 will project inwardly a considerable distance to achieve a very important function more fully set out hereinafter.

The obverse side 11 of the respective push-disks 7 has the word "Push" printed thereon. This word, obviously, serves to indicate the manner in which the device is to be used. The reverse side 12 of the disks 7 is normally concealed from view by the disks 7ª, and it is the reverse side 12 of the disks 7 that has printed thereon the answers to the respective questions appearing on the front of the card 1.

Reverting again to Figure 3, it will be noted that the question set out is: "How is the setter used in hunting?" The correct answer to the above question may be readily ascertained by pushing the disks 7 and 7ª through the card 1 and then noting the answer appearing on the reverse side 12 of the push-disk 7. The answer to the above question will be found to read as follows:

"Setters carefully work the field and forest, scenting out the game, and when they locate it they silently point out to the hunter where the game is concealed."

In order to prevent the disks 7 from becoming lost or misplaced after they have been removed, novel means in the form of the substantially projecting ears 10 is provided and utilized to retain said disks in place in their respective openings 13 upon insertion therein. The manner in which the disks are retained in the openings 13 is illustrated in greatly exaggerated form in Figure 8 of the drawings. Here, it will be noted, the ears 10 project sufficiently far into the openings 13 to form positive retaining members which engage the disks and hold the same in place in a plane substantially intermediate the top and bottom faces of the card 1. It will be clear that when the disks 7 and 7ª are pushed through the card, certain fibers 9ª of the uncut portions 9 will project beyond the periphery of the disks as illustrated in exaggerated form in Figure 5. These fibers cooperate with the ears 10 to form auxiliary retaining members.

In order to avoid inadvertent replacement of a disk 7 in an opening 13 other than that from which it was removed, and thus to avoid positioning an answer below a question to which it is not related, the various questions may be numbered and the disks 7 correspondingly numbered as illustrated by way of example in Figure 6, wherein the numeral VII has been used to number the question and its corresponding answer.

As an alternative arrangement to the above, the answers to the questions may be printed upon the concealed side 14 of the disks 7ª, and said disks may be replaced in the openings 13 in lieu of the disks 7. In either case, i. e., where the answer is printed upon the concealed, reverse side 12 of a disk 7 or the concealed side 14 of the disk 7ª, the particular disk which does not bear an answer may have printed thereon suitable advertising material in the form of descriptive matter, advertising slogans, etc., which will not be disclosed to the recipient of the game or advertising device until the disk has been pushed out to ascertain the answer to a particular question. Said advertising matter is then revealed incidentally to the ascertainment of said answer.

Any suitable number of players may participate in the game, the object of which is to test the knowledge of the respective players by requiring them to answer one or more of the questions appearing upon the card. The accuracy of any given answer may be immediately checked by removing the appropriate push-disk as described above.

The appearance of the game or advertising device may be enhanced by a colored border 15 at the edges of the top layer 2, and the disks 7 may be tinted with various and harmonious colors to achieve a greater aesthetic appeal. The coloring of the disks preferably extends beyond the edges of the openings 13 and terminates at the circular outline 16, as shown in Figures 1 and 3. With the coloring thus arranged, it will be evident that when the disks 7 are pushed through the card, a colored ring will remain surrounding the openings 13, and when a disk is properly replaced in said opening, said ring will form an attractive border framing the answer appearing on said disk, as shown in Figure 6.

Figure 9 illustrates a modification of the invention consisting of a card 17 having a space for advertising matter 18, a single illustration, a question, and push-disk 20 containing a concealed answer to said question, similar to the illustration, question and concealed answer shown in Figures 3 and 6. It will be obvious that the cost of manufacture of relatively small cards such as shown in Figure 9 will be a great deal less than the cost of manufacturing a large card such as shown in Figure 1. In accordance with the modification, instead of providing a single large card with a plurality of illustrations relating to the same subject matter, a series of individual cards may be distributed one at a time but all relating to a common subject. Thus, it is contemplated that a card such as shown in Figure 9 may be identified as belonging to the "Dog" series and may be numbered I. Additional cards of the same series may be numbered consecutively. The push-disks 20 may be properly identified to correspond to a respective individual card. In Figure 9, the push-disk 20 bears the identifying indicia: "No. I"—"Dog series."

It will be understood that various modifications of the invention disclosed herein may be made without departing from the spirit thereof or from the scope of the appended claims.

What I claim is:

1. An educational device, comprising a card, said card having a picture and a question thereon, said question relating to the subject of said picture; a detachable section below said question and containing an answer to said question and normally concealing said answer from view; and means constructed and arranged so that after detachment of said section the same may be reassembled and retained in said card with said answer revealed.

2. In a device of the class described, a card including a plurality of sheets of substantially stiff cardboard arranged in superimposed relation, one of said sheets having a question thereon, detachable push-out means associated with said card and containing an answer to said question, said answer normally being concealed from view, and means associated with said card designed so that said push-out means may be removed and subsequently reassembled with and retained in said card with said answer revealed.

3. A game of the question and concealed answer type which may be distributed for advertising purposes, comprising a card having space for advertising material; a plurality of different pictures relatively disposed to said space, a question associated with each of said pictures and generally relating to the subject of the individual pictures, and a push-out section associated with each of said questions and containing an answer to a respective question, said answers being normally concealed from view by said push-out sections, and means whereby said push-out sections, after being removed, may subsequently be retained in said card with said answers revealed.

4. A device of the class described comprising a sheet of material having a push-out section outlined by a series of cuts extending substantially through said sheet, said cuts being spaced by uncut portions, said uncut portions being designed to form projecting ears upon ejection of said push-out section, said ears being capable of retaining said push-out section in place upon reassembly of said push-out section.

5. In a device of the class described, a card comprising a plurality of layers of substantially stiff material arranged in superimposed relation, said layers having push-out portions arranged in superimposed relationship, and means detachably securing said push-out portions in place and constructed so as to be capable of retaining at least one of said portions in place upon detachment and reassembly thereof.

6. An educational device comprising a plurality of sheets of superimposed material, one of said sheets having a question upon the face thereof, a series of cuts extending substantially through both of said sheets so as to provide push-out means consisting of a section of each of said sheets, one of said push-out sections containing an answer to said question.

7. An educational device comprising a sheet having a question thereon, a section containing an answer to said question disposed in an aperture in said sheet and in such manner that the answer is concealed, said section being removable, and means operative to retain said section in said aperture after removal and upon insertion therein and in such manner that said answer is revealed.

8. An educational device comprising a card including a front layer and a back layer arranged in superimposed relation, a series of cuts extending substantially through said layers and outlining superposed push-out sections, said cuts being spaced by uncut portions designed to form projecting ears upon ejection of said push-out sections, said top layer having a question upon the upperside thereof, and an answer to said question on the underside thereof upon its associated push-out section, said ears being capable of retaining at least said latter push-out section in place upon reassembly thereof, said push-out section being adapted to be reversed prior to said reassembly to render said answer readable from the front of said card.

GRAFF F. WOLFE.